United States Patent [19]

Kimberlin

[11] Patent Number: 4,863,002

[45] Date of Patent: Sep. 5, 1989

[54] ACTIVE VEHICLE SUSPENSION APPARATUS WITH SUSPENSION VELOCITY RESPONSIVE ACTUATOR UNLOADING

[75] Inventor: Dan R. Kimberlin, Rochester Hills, Mich.

[73] Assignee: General Motors Corporation, Detroit, Mich.

[21] Appl. No.: 230,556

[22] Filed: Aug. 10, 1988

[51] Int. Cl.[4] .................. F16F 5/00; B60G 17/00; B60G 11/26
[52] U.S. Cl. .................. 188/318; 267/64.16; 280/714
[58] Field of Search ............... 280/714, 707; 188/313, 188/318, 319; 267/34, 64.15, 64.16, 221, 64.26; 91/435, 437

[56] References Cited

U.S. PATENT DOCUMENTS

| 2,426,692 | 9/1947 | Katz | 91/435 |
| 3,013,810 | 12/1961 | Hanna | 267/64.16 X |
| 3,896,702 | 7/1975 | Shah et al. | 91/375 |
| 4,266,467 | 5/1981 | Keller et al. | 91/437 |
| 4,625,993 | 12/1986 | Williams et al. | 280/707 |
| 4,702,490 | 10/1987 | Yamaguchi et al. | 267/64.16 X |

Primary Examiner—Robert J. Oberleitner
Attorney, Agent, or Firm—Robert M. Sigler

[57] ABSTRACT

A double acting hydraulic actuator in an active vehicle suspension control is connected to the sprung mass through a bushing allowing limited movement therebetween. A piston in a bore within the upper housing of the actuator forms a control chamber with and outlet orifice. The piston has a finger engaging the sprung mass and thus being driven downward with a sharp upward road disturbance that causes compression of the bushing. The increase of pressure in the control chamber due to the flow limiting of the orifice activates a valve which opens the activating chambers of the actuator to each other while the pressure exceeds a predetermined pressure. Thus the hydraulic actuator is quickly unloaded to absorb sudden road disturbances and prevents them from being transmitted directly through the incompressible fluid of the actuator to the sprung mass before the main suspension control can react.

3 Claims, 2 Drawing Sheets

ACTIVE VEHICLE SUSPENSION APPARATUS WITH SUSPENSION VELOCITY RESPONSIVE ACTUATOR UNLOADING

BACKGROUND OF THE INVENTION

This invention relates to an active vehicle suspension which includes an actuator capable of varying the suspension force between the vehicle sprung and unsprung masses.

A typical actuator is a double acting hydraulic actuator connected between the sprung and unsprung masses in parallel with a load supporting spring and having a pair of activating chambers with hydraulic fluid therein so that an increase in fluid pressure in one of the activating chambers relative to the other increases or decreases the vertical force supporting the sprung mass from the nominal spring force, depending on which chamber sees the excess pressure. A hydraulic fluid control apparatus is effective to control the pressure of fluid in each of the activating chambers in response to sensed vehicle dynamic parameters to produce a desired control of the vehicle sprung mass. A typical goal of such a system is to maintain the sprung mass attitude during vehicle dynamic maneuvers such as turning, braking, etc., although the system may further be designed to respond to the faster vertical motions produced by road surface disturbances to produce a desired ride quality.

In any particular system, however, some road inputs may produce an unsprung mass motion that is too quick for the normal control response time of the control. This is particularly true of sudden vertically upward impacts from bumps or objects in the road, curbs, etc. In such cases, the actuator, which may be filled with a substantially incompressible fluid, can act as a rigid member and tend to immediately transmit the shock of the disturbance directly to the sprung mass before the control has a chance to respond and adjust the suspension force. If the disturbances are quite small, they can be absorbed by a bushing between the actuator and the sprung mass. However, good suspension design places limits on the absorption capacity of such bushings; and some such disturbances exceed that capacity.

Even if the system can respond to such disturbances in time, however, it is wasteful of energy to require the actuators to produce the required response from the on-board energy supply of the hydraulic control when the energy needed for response to a vertically upward road disturbance is potentially provided by the road itself. All that is really necessary is the unloading of the actuator by opening the activating chambers to each other so as to allow the road disturbance to collapse the actuator as necessary without communicating the disturbance through the actuator to the sprung mass. However, the timely sensing of the road input and very fast response required may be beyond the capabilities of the control, particularly if it is microprocessor based.

SUMMARY OF THE INVENTION

The invention described and claimed herein provides a response to vertically upward road disturbances in a active vehicle suspension including a hydraulic actuator as described above by including hydraulic fluid operated unloading apparatus within the actuator itself. The apparatus responds to sudden upward road disturbances of significant size and quickness to unload the actuator and open the activating chambers to each other. The apparatus is compact, entirely fluid operated and contained within the actuator itself for the fastest possible response time.

The invention more particularly comprises an improvement to an active suspension apparatus for a motor vehicle comprising a hydraulic actuator having a first member connected to a sprung mass of the vehicle and a second member connected to an unsprung mass of the vehicle, the first and second members being sealingly slidable with respect to each other and defining a pair of activation chambers therebetween connected to hydraulic fluid control apparatus effective to selectively increase the fluid pressure in one of the activation chambers relative to the fluid pressure in the other of the activation chambers in response to selected vehicle dynamic parameters so as to selectively vary the force between the sprung and unsprung masses of the vehicle and thus control vehicle sprung mass movement according to predetermined criteria, the first member being connected to the sprung mass through a resilient bushing means effective to allow a limited vertical movement therebetween.

The improvement comprises a portion of the first member defining a control chamber with hydraulic fluid therein and a movable wall effective to change the volume of the control chamber, the portion of the first member further including an orifice allowing the escape of fluid from the control chamber at a limited flow rate with reduction of the volume of the control chamber and means connected to the movable wall and responsive to the sprung mass to move the movable wall with and at the same rate as relative movement of the first member and sprung mass toward each other and thus attempt to pump hydraulic fluid through the orifice at a rate varying directly with the rate of said relative movement of the first member and sprung mass toward each other. The fluid pressure in the control chamber thus increases with the rate of relative movement of the first member and sprung mass toward each other. The portion of the first member further defines a pressure responsive valve effective to open the activating chambers to each other while the fluid pressure in the control chamber exceeds a predetermined pressure. Thus the hydraulic actuator is allowed to absorb sudden impacts on the unsprung mass toward the sprung mass producing at least a predetermined suspension velocity to prevent the translation of such impacts to the sprung mass.

Further details and advantages of this invention will be apparent from the accompanying drawings and following description of a preferred embodiment.

DESCRIPTION OF THE PREFERRED EMBODIMENT

Figure 1:
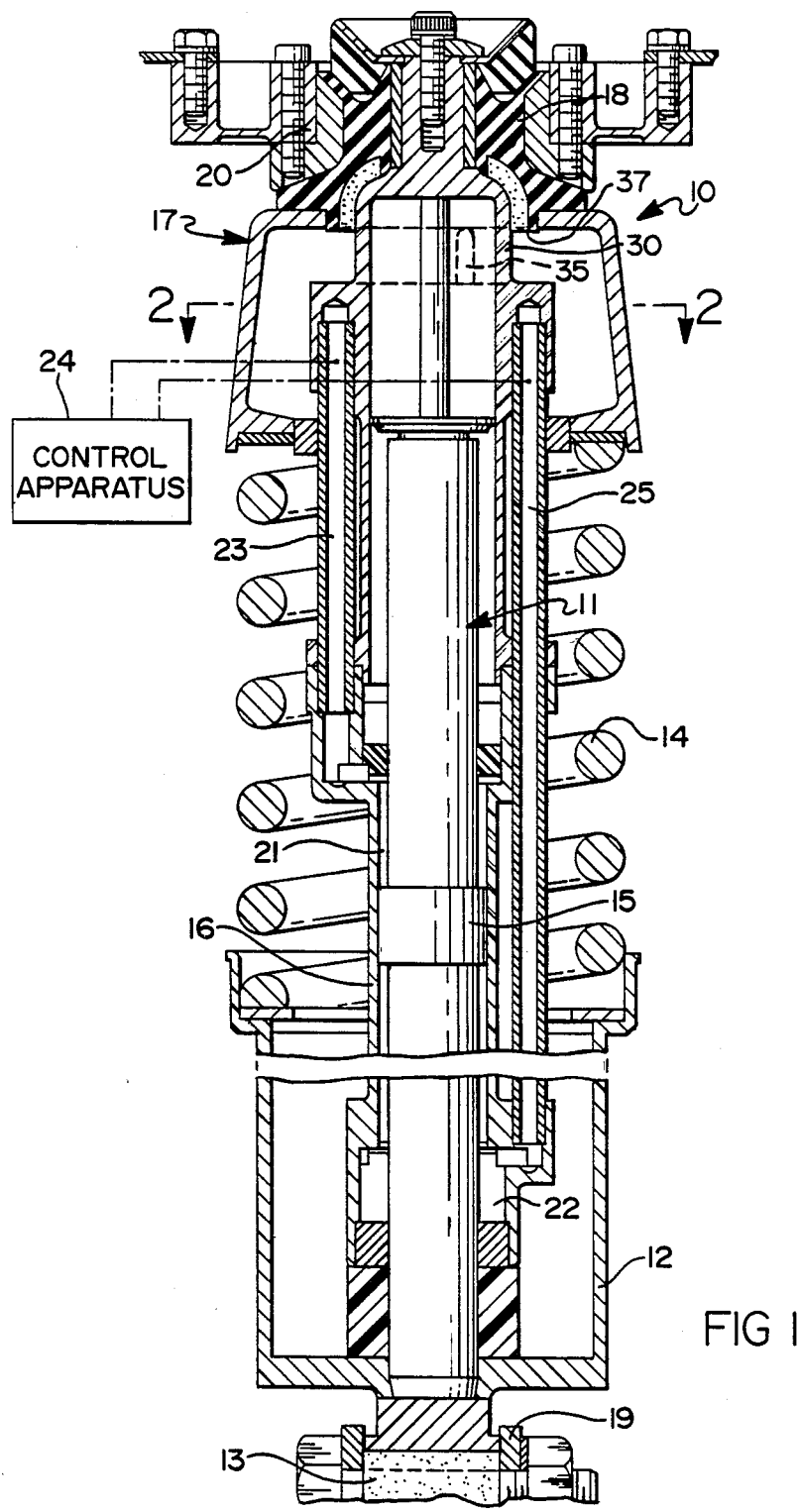
FIG. 1 is partial cutaway view of an actuator in an active suspension apparatus according to this invention.

Referring to FIG. 1, a double acting hydraulic actuator 10 comprises an inner piston rod or tube 11 fixedly attached at its lower end to a lower housing member 12 including a mounting eye 13 by which it is attached to a member 19 of the unsprung mass at one wheel of the vehicle for vertical movement with the wheel. Piston rod 11 has a larger diameter piston portion 15 which slidably and sealingly engages an actuator cylinder 16 surrounding and coaxial therewith and attached to an upper housing assembly 17. Upper housing assembly 17 is attached through a bushing 18 to a member 20 of the vehicle body, which is the sprung mass of the vehicle. A vehicle suspension spring 14 is compressed between spring seats formed in upper housing assembly 17 and lower housing member 12 so that actuator 10 is connected in parallel with spring 14.

Piston portion 15 divides the interior space of actuator cylinder 16 into upper and lower activating chambers 21 and 22, respectively, both of which are closed by annular sealing means against piston rod 11. Upper chamber 21 is open to a fluid supply passage 23; and lower chamber 22 is open to a fluid supply passage 25, both passages being in upper housing assembly 17. Fluid supply passages 23 and 25 are connected in a standard manner to a standard pilot valve controlled by an electronic or other control and comprising control apparatus 24 responsive to vehicle dynamic inputs to provide an excess of fluid pressure in one of chambers 21 and 22 over that in the other in order to vary the suspension force between the sprung and unsprung masses in real time and thus control the movement and attitude of the sprung mass and, if desired, the ride quality. An example of such a control for a double acting hydraulic actuator may be seen in the U.S. Pat. No. 4,625,993 to Williams et al, issued Dec. 2, 1986 with the title Vehicle Suspension System. Briefly, the system controls, through the pilot valve, the application of a source of high pressure hydraulic fluid to chamber 21 to drive the sprung and unsprung masses toward each other or to chamber 22 to drive the sprung and unsprung masses away from each other, depending on which action the control determines is necessary at any given time from the sensed vehicle dynamic parameters and its internal operating algorithm or program. While one of chambers 21 and 22 is open to the high pressure fluid, the other is open to a low pressure return line. In order to reduce energy requirements in steady state conditions, the static weight of the sprung mass is typically supported on suspension spring 14 as shown, with actuator 10 adding or subtracting from the suspension spring force.

Actuator 10 as described to this point is essentially typical of those known in the prior art. During the operation of such an actuator, there is some error due to time lags, etc., in the control and actuator itself. Some of this error is taken up by bushing 18. However, in order to avoid a "mushy" ride, the shock absorption capacity of bushing 18 is limited. When high pressure fluid is within upper activating chamber 21, a sudden vertically upward suspension disturbance cannot be absorbed by the actuator, which is essentially rigid, until the pilot valve opens to allow exhaust of the fluid from the chamber. If a significant time elapses in the response of, for example, an electronic microprocessor control, a sharp upward road disturbance on the unsprung mass will be immediately transmitted directly through the actuator 10 and, with only a slight absorption by bushing 18, directly to the sprung mass 20, unless a faster means of response is incorporated in actuator 10.

Figure 2:
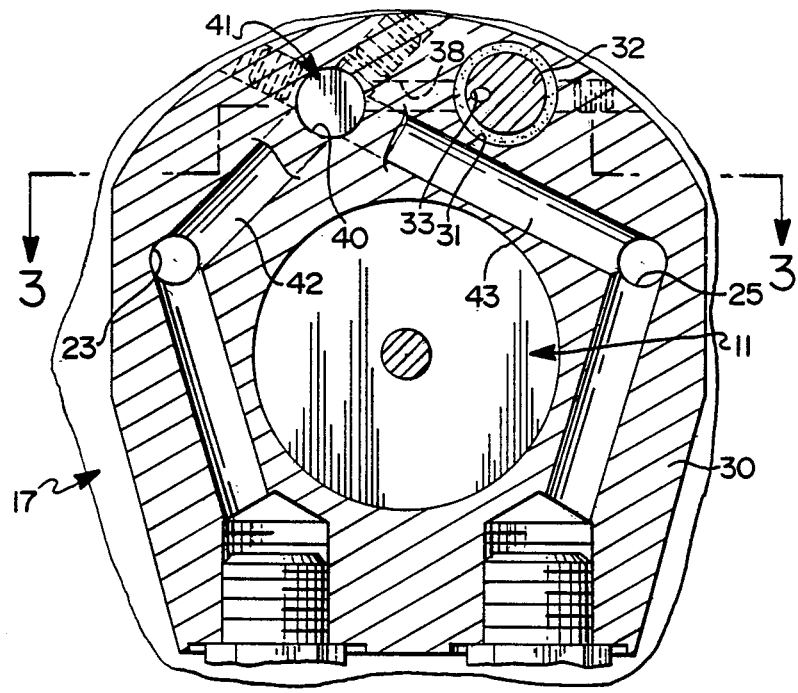
FIG. 2 is a section view along lines 2—2 in FIG. 1.
Figure 3:
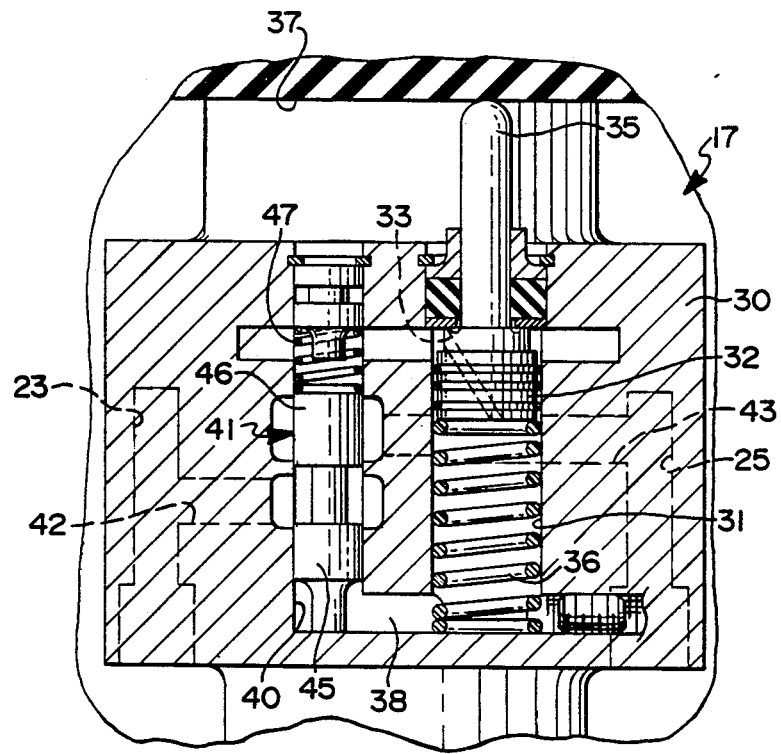
FIG. 3 is a section view along lines 3—3 in FIG. 2.

Therefore, actuator 10 incorporates the additional apparatus shown in FIGS. 2 and 3. Upper housing assembly 17 includes a member 30 including a cylindrical bore 31 within which is movable a piston 32. In combination with movable piston 32, cylindrical bore 31 comprises a control chamber with a movable wall. The control chamber is filled with hydraulic fluid under pressure and is kept filled with fluid through appropriate passages or internal leakage so that no air exists within the chamber at any time. An orifice 33 is provided through piston 32 and thus between the interior and exterior of the control chamber. A finger 35 projects upward from the top of piston 32; and a coil spring 36 within bore 31 under piston 32 biases piston 32 upward so that finger 35 engages a surface 37 of bushing 18 radially outward from the center thereof. Since actuator 10 engages bushing 18 at its center but is supported by the vehicle sprung mass toward its outer periphery, there will be a relative axial movement between upper housing assembly 17 of the actuator and the spot on surface 37 engaged by finger 35 with sudden upward suspension travel. Finger 35 does not have to engage bushing 18—it could engage the vehicle sprung mass itself. The engagement with the bushing is for convenience; and the location of the spot on the bushing which it engages is a spot which essentially does not move with actuator 10. It should be made clear at this point that the movement under discussion is not the movement between piston rod 11 and actuator tube 16 within actuator 10 but the much smaller axial movement between the upper end of actuator 10 and the sprung mass, which is the movement of the bushing. However, for a short time duration at the beginning of an upward road disturbance while actuator 10 is essentially rigid, this movement is the suspension movement and its velocity is suspension velocity.

The compression of bushing 18 due to a sharp upward road disturbance will cause finger 35 to push piston 32 downward within bore 31 at a velocity which increases with the upward relative velocity of the upper housing assembly 17 relative to the sprung mass of the vehicle. Generally, the larger and quicker the road disturbance, the faster will be the velocity of piston 32 downward. Fluid in the control chamber formed by bore 31 is pumped through orifice 33 by piston 32 being driven downward and thus reducing the volume of the control chamber. However, the rate at which fluid can escape through orifice 33 is limited; therefore increasing downward velocity of piston 32 causes an increase in fluid pressure within the control chamber.

Bore 31, and thus the control chamber formed therein, communicates through a passage 38 to another cylindrical bore 40 which houses a spool valve member 41. A passage 42 communicates with passage 23 and thus with upper activating chamber 21 and opens to bore 40. A passage 43 communicates with passage 25 and thus with lower activating chamber 22 and also opens to bore 40. Spool valve member 41 has a lower land 45 which blocks the outflow of fluid from passage 38 through bore 40 and is subjected to the fluid pressure from the control chamber across at least part of its lower surface to bias it upward with a force increasing with that pressure. It further has an upper land 46 which prevents communication between passages 42 and 43 when in the position shown in FIG. 3, a position into which it is normally biased by a coil spring 47 within bore 41 above it pushing downward. When the pressure in the control chamber increases sufficiently, due to the inability of fluid to escape through orifice 33 as fast as it is being pumped by downward movement of piston 32, spool valve member 41 is driven upward against the downward force of spring 47 to a position in which passages 42 and 43, and thus activating chambers 21 and 22, are open to each other. As soon as the pressure in the control chamber decreases, spring 47 moves spool valve member 41 downward to end the communication of passages 42 and 43.

The result is that the actuator is unloaded and allowed to collapse almost immediately upon the onset of the upward road disturbance but stays unloaded only during the initial portion of the disturbance. This allows the disturbance itself to collapse the actuator as necessary, with the fluid within chamber 21 being pumped through passages 23, 42, 43 and 25 to chamber 22, to absorb the shock in a manner controlled by the restrictions in the flow path. However, the flow path is closed as soon as the initial high velocity movement of the upper housing assembly 17 relative to the sprung mass member 20 is over and the flow path is no longer needed, so that interference with the normal operation of the control system is minimized.

The embodiments of the invention in which an exclusive property or privilege is claimed are defined as follows:

1. In an active suspension apparatus for a motor vehicle comprising a hydraulic actuator having a first member connected to a sprung mass of the vehicle and a second member connected to an unsprung mass of the vehicle, one of the first and second members comprising a cylinder and the other of the first and second members comprising a piston sealingly slidable within the cylinder to define a pair of activation chambers connected to hydraulic fluid control apparatus effective to selectively increase the fluid pressure in one of the activation chambers relative to the fluid pressure in the other of the activation chambers in response to selected vehicle dynamic parameters so as to selectively vary the force between the sprung and unsprung masses of the vehicle and thus control vehicle sprung mass movement according to predetermined criteria, the first member being connected to the sprung mass through a resilient bushing means effective to allow a limited vertical movement therebetween, the improvement comprising:

a portion of the first member defining an enclosed control chamber filled with hydraulic fluid and a flow restricting outlet orifice from the control chamber, the portion of the first member comprising a movable wall of the chamber having an engagement portion axially engaging one of the sprung mass and a portion of the bushing moving essentially with the sprung mass for axial movement therewith so as to reduce the volume of the control chamber with movement of the first member toward the sprung mass and thus pump hydraulic fluid through the orifice at a rate varying with the rate of said movement, the fluid pressure in the control chamber thus increasing with the rate of said movement;

the portion of the first member further comprising normally closed passage means between the activation chambers and a valve responsive to the fluid pressure in the control chamber to open the passage means and thus communicate the activating chambers with each other while the fluid pressure in the control chamber exceeds a predetermined pressure, whereby the hydraulic actuator is allowed to absorb sudden impacts on the unsprung mass toward the sprung mass producing at least a predetermined suspension velocity to prevent translation of such impacts to the sprung mass.

2. The improved active suspension apparatus of claim 1 in which the first member is connected to the bushing means at a location horizontally spaced from the location at which the bushing is connected to the sprung mass, the control chamber comprises a first vertically aligned cylindrical bore in the portion of the first member, the movable wall comprises a piston in the bore with the orifice therethrough and the engagement portion of the movable wall comprises a finger projecting upward to engage a portion of the bushing moving essentially with the sprung mass, the first portion further comprising first biasing means biasing the piston upward into said engagement.

3. The improved active suspension apparatus of claim 2 in which the pressure responsive valve comprises a second vertically aligned cylindrical bore in the portion of the first member and open at the lower end thereof through a connecting passage to the control chamber, the portion of the first member further defining valve openings in the middle of the second vertically aligned cylindrical bore to the activating chambers and a spool valve member within the second vertically aligned cylindrical bore biased downward by second biasing means against the fluid pressure of the control chamber to a position in which a land thereof blocks communication between the valve openings and thus the activating chambers, the spool valve member being moved by the fluid pressure in the control chamber exceeding the force of the second biasing means to a position in which communication is established between the valve openings and thus the activating chambers.

* * * * *